US011196689B2

(12) United States Patent
White et al.

(10) Patent No.: US 11,196,689 B2
(45) Date of Patent: Dec. 7, 2021

(54) SITUATIONAL MESSAGE DEFERRAL

(71) Applicant: Microsoft Technology Licensing, LLC, Redmond, WA (US)

(72) Inventors: Ryen William White, Woodinville, WA (US); Peter Richard Bailey, Canberra (AU); Mathieu Etienne Jacques Audouin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 15/926,860

(22) Filed: Mar. 20, 2018

(65) Prior Publication Data
US 2019/0297040 A1    Sep. 26, 2019

(51) Int. Cl.
*H04L 12/58* (2006.01)
*G06N 20/00* (2019.01)
*G06Q 10/10* (2012.01)

(52) U.S. Cl.
CPC .......... *H04L 51/08* (2013.01); *G06N 20/00* (2019.01); *G06Q 10/107* (2013.01); *H04L 51/14* (2013.01); *H04L 51/24* (2013.01); *H04L 51/12* (2013.01)

(58) Field of Classification Search
CPC ......... H04L 51/08; H04L 51/14; H04L 51/24; H04L 51/12; G06N 20/00
See application file for complete search history.

(56) References Cited

U.S. PATENT DOCUMENTS

| 8,086,672 B2 * | 12/2011 | Horvitz | G06Q 10/107 709/206 |
| 9,825,896 B2 | 11/2017 | Snider et al. | |
| 10,645,046 B2 * | 5/2020 | Umapathy | H04L 51/14 |
| 2003/0100261 A1 * | 5/2003 | Gusler | H04W 4/16 455/18 |
| 2006/0098792 A1 * | 5/2006 | Frank | H04M 3/53 379/70 |

(Continued)

FOREIGN PATENT DOCUMENTS

WO    2015147926 A1    10/2015

OTHER PUBLICATIONS

"International Search Report and Written Opinion Issued in PCT Application No. PCT/US2019/021520", dated Jun. 6, 2019, 15 Pages.

(Continued)

*Primary Examiner* — Shirley X Zhang
(74) *Attorney, Agent, or Firm* — Shook, Hardy and Bacon L.L.P.

(57) ABSTRACT

Examples are disclosed that relate to deferring a message based upon a target situation for message presentation. One example provides a computing device including an output subsystem including one or more output devices, an input subsystem including one or more user input devices, and a logic device. The computing device further includes memory storing instructions executable by the logic device to receive a message from a remote computing system, output a notification of the message via the output subsystem, and receive via the input subsystem a request for a deferral of the message, the request for the deferral including an annotation to be stored for a later presentation with the message.

20 Claims, 14 Drawing Sheets

(56) References Cited

U.S. PATENT DOCUMENTS

| | | | | |
|---|---|---|---|---|
| 2008/0076395 | A1* | 3/2008 | Bhatia | H04M 3/42365 455/413 |
| 2009/0132662 | A1* | 5/2009 | Sheridan | H04L 51/26 709/206 |
| 2009/0254624 | A1 | 10/2009 | Baudin et al. | |
| 2010/0082751 | A1* | 4/2010 | Meijer | G06F 15/16 709/206 |
| 2010/0246785 | A1* | 9/2010 | Wang | H04M 3/48 379/88.23 |
| 2010/0246791 | A1* | 9/2010 | Wang | H04M 3/42195 379/201.02 |
| 2014/0141818 | A1* | 5/2014 | Yoakum | H04L 51/26 455/466 |
| 2014/0155039 | A1* | 6/2014 | Kim | H04M 1/72552 455/412.1 |
| 2014/0223347 | A1 | 8/2014 | Seo et al. | |
| 2014/0303842 | A1* | 10/2014 | Boelter | B60K 35/00 701/36 |
| 2015/0172236 | A1* | 6/2015 | Meijer | G06F 15/16 709/206 |
| 2015/0266377 | A1* | 9/2015 | Hampiholi | B60K 35/00 455/466 |
| 2016/0165040 | A1* | 6/2016 | Queru | B60K 35/00 455/418 |
| 2016/0248712 | A1 | 8/2016 | Snider et al. | |
| 2017/0041274 | A1 | 2/2017 | Snider et al. | |
| 2017/0289093 | A1 | 10/2017 | Snider et al. | |
| 2017/0344854 | A1* | 11/2017 | Behringer | G06F 16/435 |
| 2017/0359277 | A1 | 12/2017 | Snider et al. | |
| 2018/0007198 | A1* | 1/2018 | Rabra | H04M 15/844 |
| 2019/0007356 | A1* | 1/2019 | Loi | H04L 51/12 |
| 2019/0156158 | A1* | 5/2019 | Behringer | G06F 16/435 |
| 2019/0297040 | A1* | 9/2019 | White | H04L 51/24 |

OTHER PUBLICATIONS

"Trove for Alexa: Talk to your Email," YouTube Website, Available Online at https://www.youtube.com/watch?v=O9-kzLhKnNQ, Jun. 22, 2017, 3 pages.

"Trove," Trove Website, Available Online at https://trove.com/, Available as Early as Jun. 4, 2017, 3 pages.

* cited by examiner

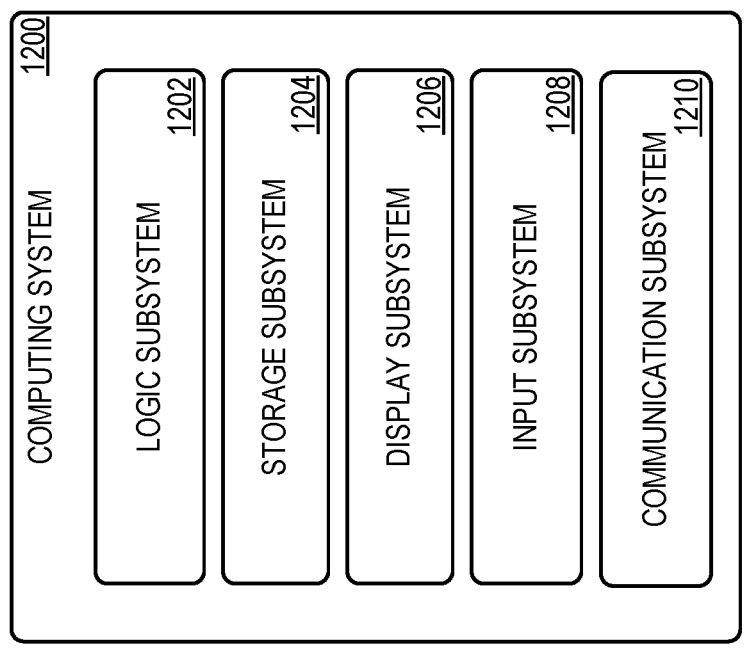

SITUATIONAL MESSAGE DEFERRAL

BACKGROUND

Digital messages may be exchanged via many different types of electronic messaging services, including email and text messaging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One disclosed example provides a computing device comprising an output subsystem including one or more output devices, an input subsystem comprising one or more user input devices, a logic device, and memory storing instructions executable by the logic device to receive a message from a remote computing system, output a notification of the message via the output subsystem, and receive via the input subsystem a request for a deferral of the message, the request for the deferral comprising an annotation to be stored for a later presentation with the message.

Another disclosed example provides a method comprising receiving a message addressed to a user account, obtaining message features associated with the message, obtaining situational features relating to a current situation of an in-use computing device associated with the user account, via a machine learning model based on one or more learned actions associated with the message features and the situational features, determining one or more possible responsive actions that are likely to be taken for the message, and providing an output based on the one or more possible responsive actions determined.

BRIEF DESCRIPTION OF THE DRAWINGS

FIG. 12 shows a block diagram of an example computing system.

DETAILED DESCRIPTION

Figure 1:
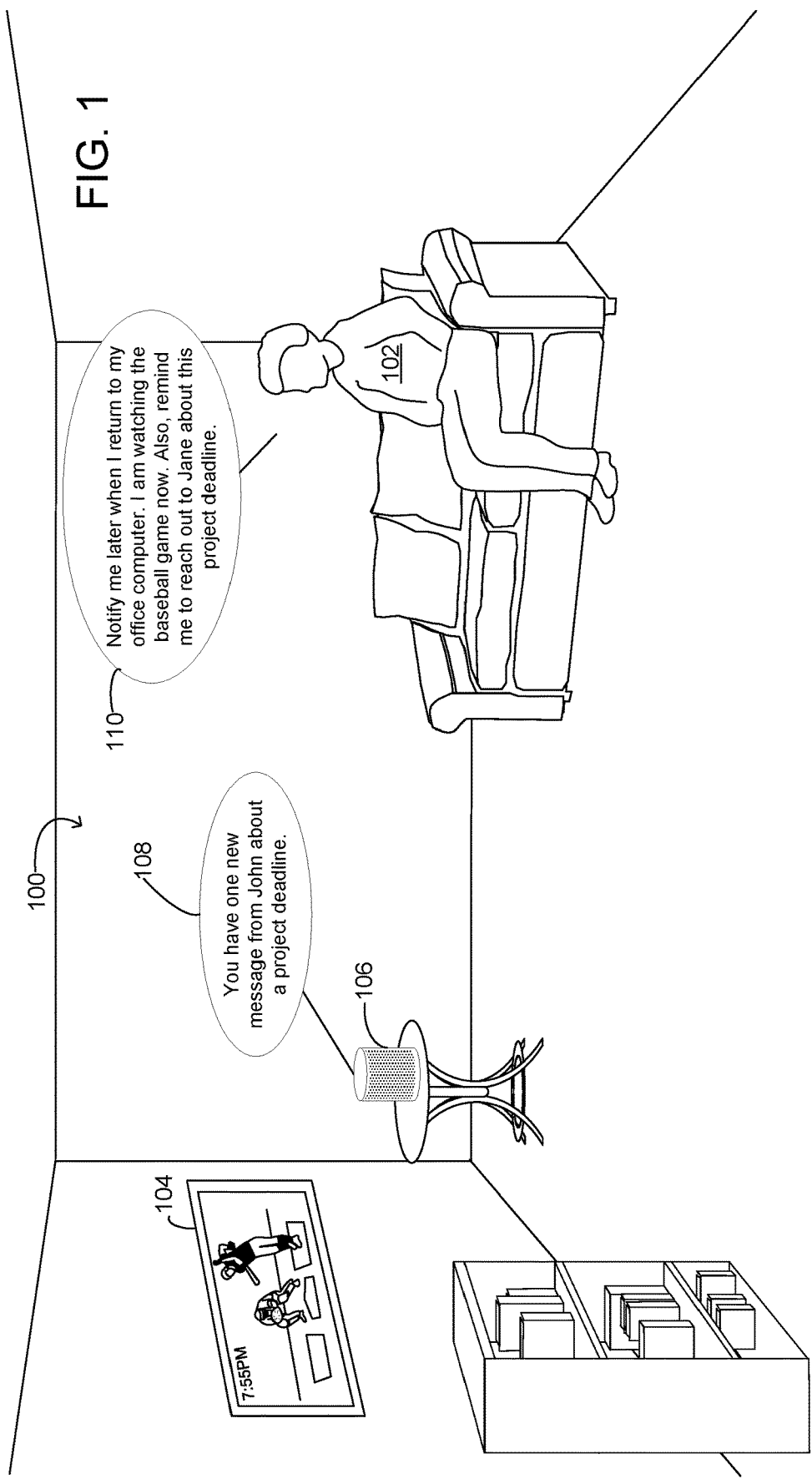
FIG. 1 shows an example use scenario for a messaging system, in which a user requests deferral of a message.

Current digital messaging platforms, such as text messaging and email platforms, may deliver a message to a recipient messaging application in real time when the application is running and connected to a computer network, or at a later time based upon application launch and/or the establishment of a network connection. Upon receiving a message, a messaging application may present a notification of the message via a user interface. However, a user may wish to act on a message at a later time, and thus may leave the message unread or otherwise mark it for follow-up. In such situations, a user may forget about a message before the message becomes actionable. For example, a message asking a spouse to pick up groceries on the way home from work that is delivered much earlier in the day may be forgotten by the time the spouse leaves work.

As such, the user may wish to defer the message to a later time in which the message is more actionable. Currently, in such instances, a user may manually mark the message for later follow-up by changing a message status from "read" to "unread," or by "flagging" the message to display a flag icon with the message. However, messaging application users commonly choose to sort messages by time. Marking a message as unread or flagging a message does not alter the message's position in a time-sorted message hierarchy. Thus, in the time between marking the message for a later follow-up and a situation suitable for acting on the message, the message recipient may receive additional new messages that bump the marked or flagged message out of view when the messaging application is opened. In view of this risk, a message recipient may forward a message to his or her own account so that the message appears at or near the top of a time-sorted hierarchy of messages. However, this approach does not provide the message any visual distinction from other new messages and must be repeated to maintain the message near a top of a time-sorted list.

Some messaging applications may enable a message recipient to select to "snooze" a message for a predetermined time duration, and/or until a user is located at a specified geographical location. However, such messaging applications may utilize a pre-defined list of times and/or locations for snoozing a message. As such, the deferral action does not consider in which situation(s) a message may be more actionable. Further, upon the eventual delivery of the message, a user may forget why the message was deferred or what the user wanted to do once the message was delivered.

Thus, examples are disclosed that may help to address these and other issues. Briefly, a messaging computing device may allow a user to request deferral of a received message. In some examples, the request for the deferral may comprise an annotation to be stored for a later presentation with the message to help jog the user's memory regarding why the message was deferred. Further, in some examples, situations in which deferral was requested may be observed over time, and message features and situational features observed when deferral occurred and/or when the message was read may be used to train a machine learning-based recommendation/action engine for recommending actions and/or taking actions on behalf of the user. In such examples, as the recommendation/action engine learns more about user habits and patterns over time, the recommendation/action engine may learn which messages to automatically defer in various situations, as well as the situations in which to present the messages. The examples disclosed herein may be used with any suitable messaging application, including but not limited to an instant messaging application, an email messaging application, and a social media messaging application.

FIG. 1 shows an example use scenario 100 for a messaging system that provides for situational message deferral. User 102 is watching a baseball game at home on television 104. While watching the baseball game, a headless device 106 outputs a notification 108 notifying the user 102 of a new message (e.g., an email message or text message) from "John" via an audio output. In other examples, other types of messaging devices may be used (e.g. a mobile computing device such as a phone or tablet, a wearable device such as a band or head-mounted device, a laptop or desktop computer).

As indicated on television 104, the current time is 7:55 PM. In response to receiving the notification 108, the user 102 verbally requests to be notified of the message from John when he returns to his office computer because he is watching a baseball game. The user's speech input 110 is interpreted as a request to defer the message until he returns to his office computer, and also is recorded and stored as an annotation for presentation with the message once in the target situation indicated, namely, when the user 102 returns to his office computer. In this example, the annotation is entered as part of the same speech command in which deferral is requested. In this instance, the user input may be parsed for terms that may represent a deferral request, and for terms that may indicate the input of a target situation. Terms that may indicate a deferral request may include "defer," "busy," "not now," "wait," "later," and "delay," as examples. Terms that may indicate the input of a target situation include "when," "after," "in," "at," and "until," followed by specific conditions of delivery such as a date, a time, a place, a particular device, etc. In the example of FIG. 1, the user speech input 110 includes the term "later" which indicates a request to defer the message, and also includes the term "when" and neighboring terms "I return to my office computer" specifying a target situation in which to present the message. In other examples, the request and the target situation may be obtained in any other suitable manner, such as via different user input modalities. Other modalities that may be used, depending upon the computer system with which the user is interacting, include gesture user inputs (e.g. as sensed by inertial motion sensors and/or analysis of image data (2-dimensional and/or depth) acquired by image sensors) In other examples, the headless device 106 (or other computer device) may prompt the user 102 to provide an annotation for the message after the deferral has been requested. It will be understood that a deferred message may be annotated with any other suitable type of input, including text and/or images, depending upon the input capabilities of the messaging device used.

Figure 2:
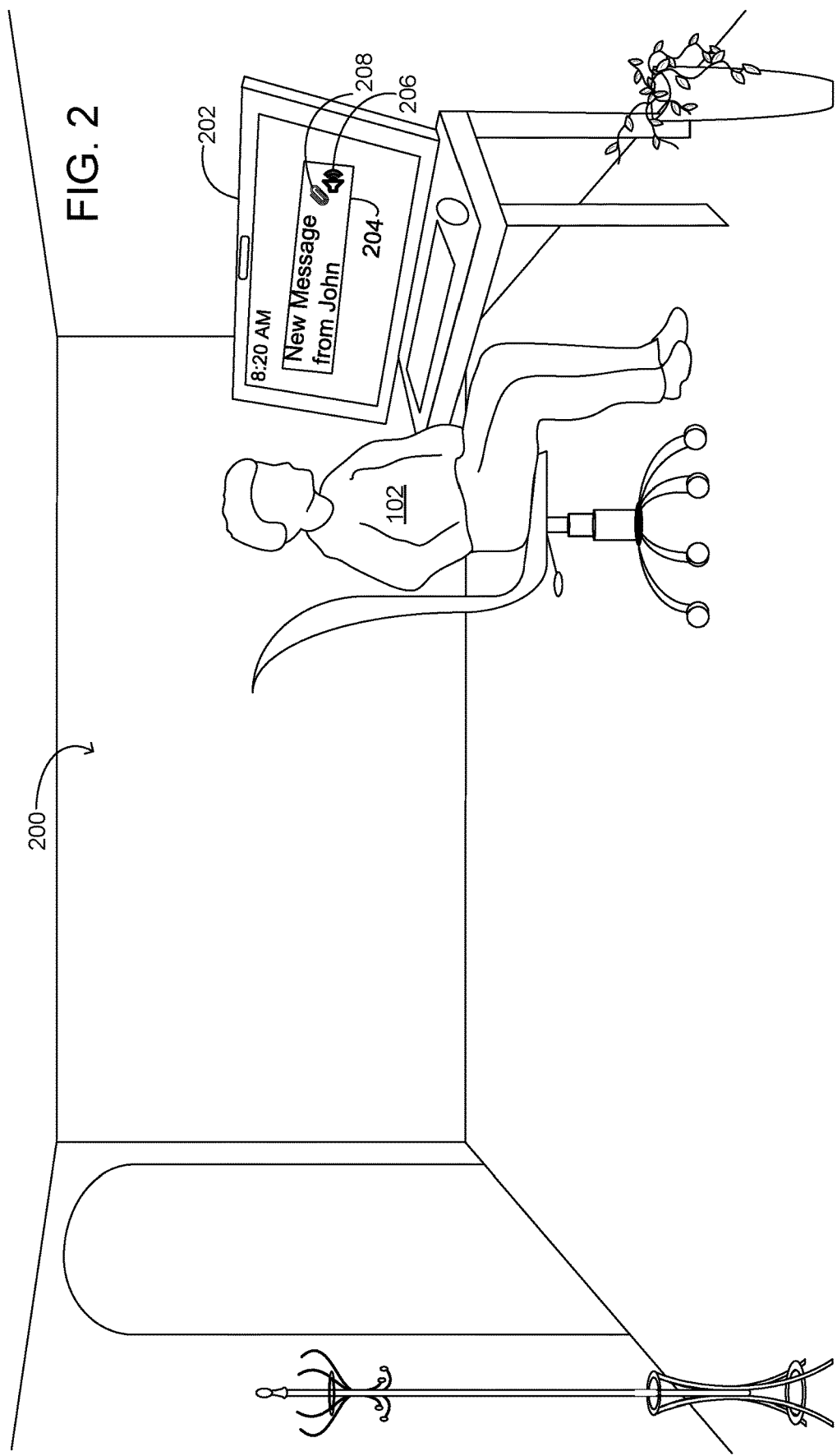
FIG. 2 shows an example of a deferred presentation of the message of FIG. 1.

FIG. 2 illustrates the deferred presentation of the message of FIG. 1. In this example, user 102 returns to his office computer, illustrated as desktop computer 202. The time is 8:20 AM and the user 102 is beginning his work day at the office. As the user is now in the target scenario specified in the message deferral request, the desktop computer 202 outputs a notification 204 regarding the deferred message from the prior evening. While FIG. 2 depicts the notification 204 being output by a different computing device than the computing device 106 which first notified the user 102 of the message, in other examples a same computing device may output the original notification and the deferred notification based upon the target situation indicated.

A notification of a deferred message may indicate whether the user previously left an annotation to the message with the deferral request. In this example, the notification 204 includes a speaker icon 206 and an attachment icon 208, indicating that an annotation for the message was left when the message was deferred, and an attachment accompanies the original message. The user 102 may select the speaker icon 206 to listen to the recorded annotation 110 stored for presentation with the message. The annotation for the message also may be output as text, either as included within the body of the message and/or presented separately from the message. Text-to-speech and speech-to-text conversion algorithms may be used to present text annotations as audio output, and speech annotations as text outputs.

Further, while depicted as a visual presentation displayed on a display device, the deferred message may be presented in other manners. For example, user 102 may request presentation of the message via an audio output, such as one generated by text-to-speech conversion. Audio presentation may be performed via a displayless computing device (a "headless" device that uses voice input/audio output as a primary interaction mode), mobile device (e.g. smart phone or wearable device), or via any other suitable computing device. An annotation for a message also may be presented via audio output.

Figure 3:
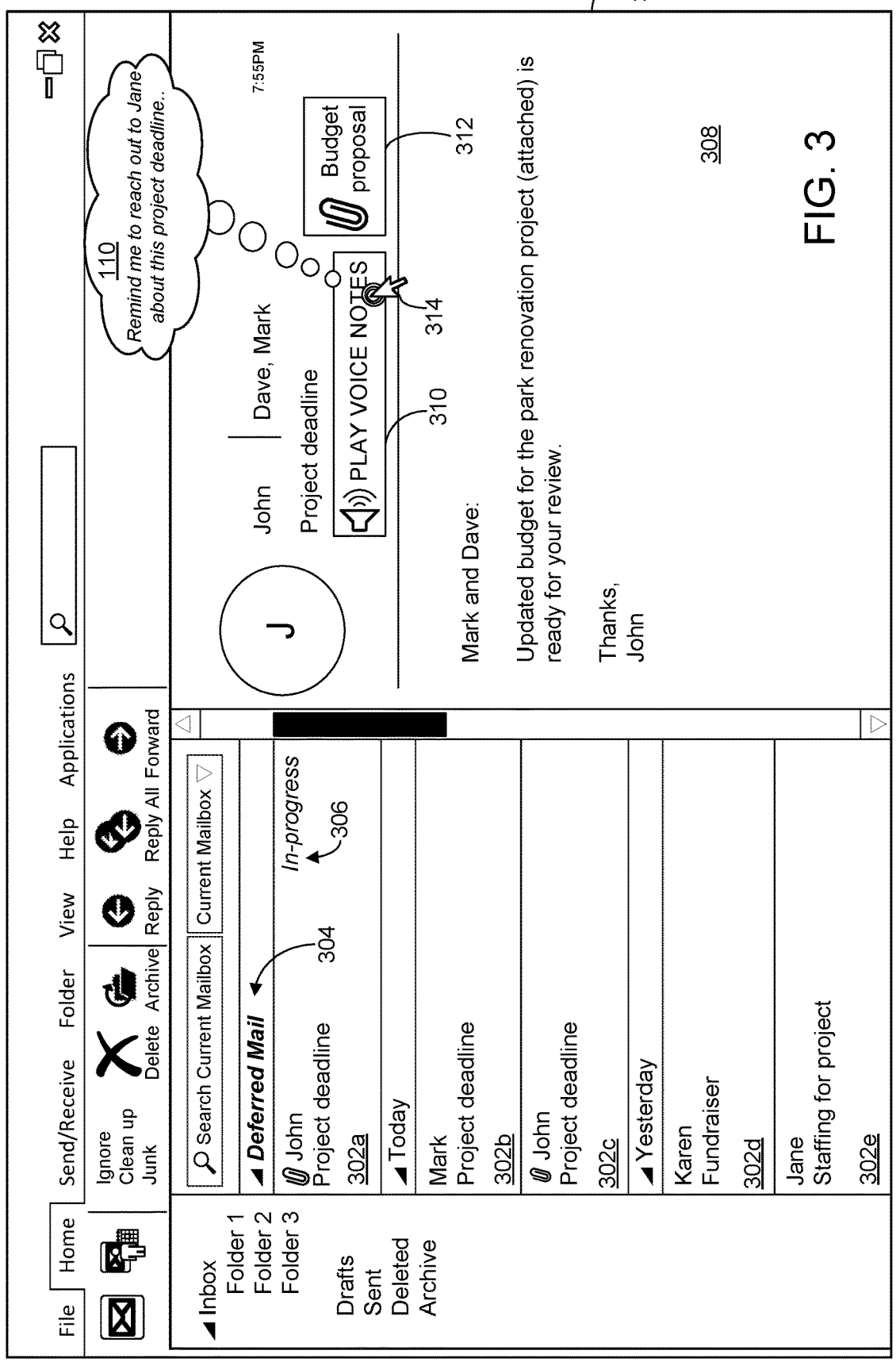
FIG. 3 shows an example user interface for a messaging application.

FIG. 3 shows another example presentation of a deferred message, via an example email application user interface 300. The depicted user interface 300 displays a plurality of email messages 302a-302e. The deferred message is depicted as message 302a and is displayed separately beneath a deferred messages tab 304 from non-deferred messages 302b-302e. In some examples, a deferred message 302a may additionally or alternatively be labeled with an "in-progress" classification 306 or other suitable indicator that the message is a deferred message, which may further visually indicate that the message 302a and/or a task associated with the message 302a is awaiting further action.

The content of the deferred message 302a, when selected, is displayed in a view area 308 in this example. This area also displays a user interface object indicating an annotation (indicated by icon 310) and an attachment (indicated by icon 312) associated with the deferred message 302a, which may be respectively selectable to present the annotation entered at the time of deferral and the attachment in the original message.

Figure 4A:
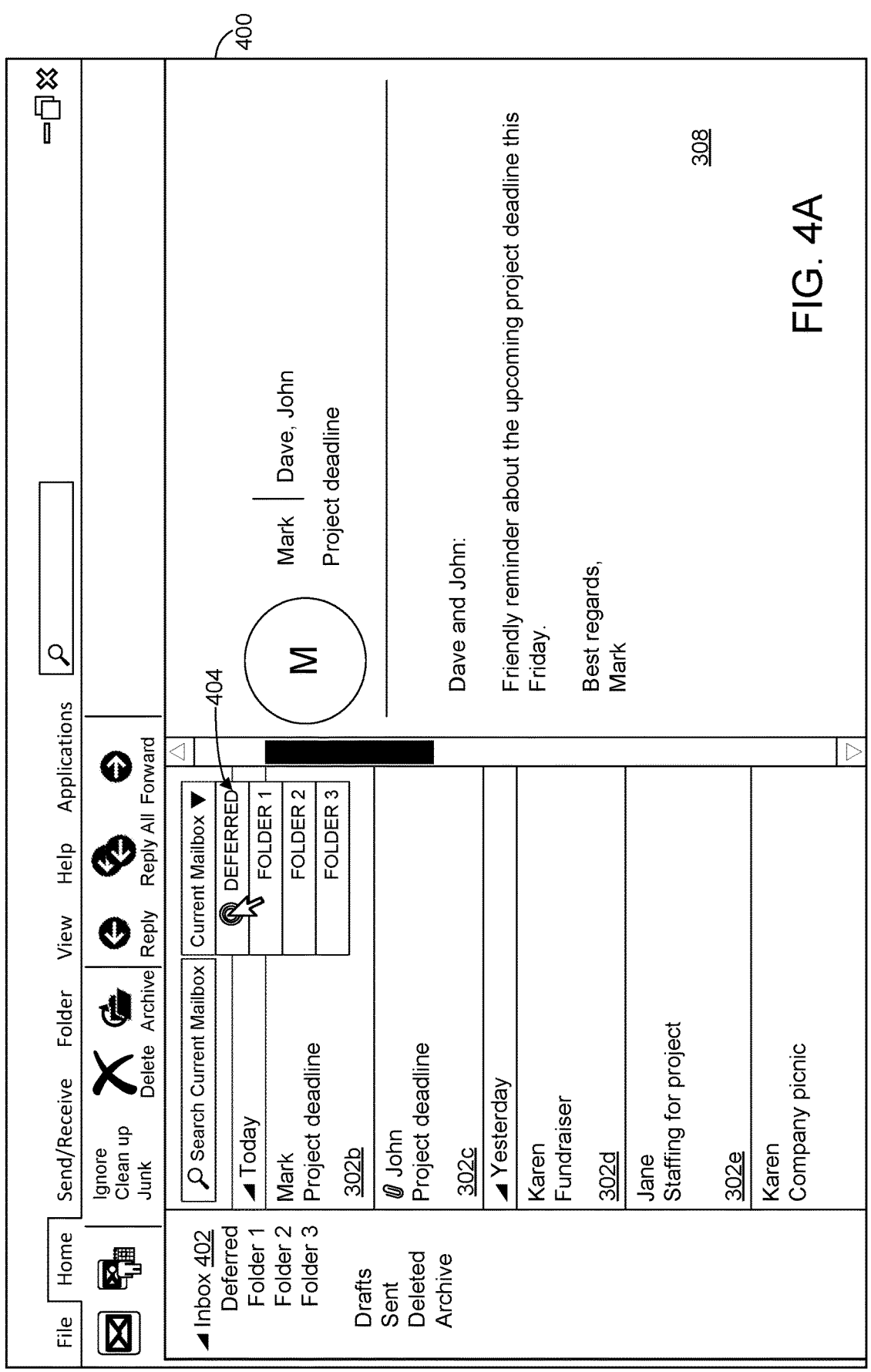
FIGS. 4A-4B show another example user interface for a messaging application.
Figure 4B:
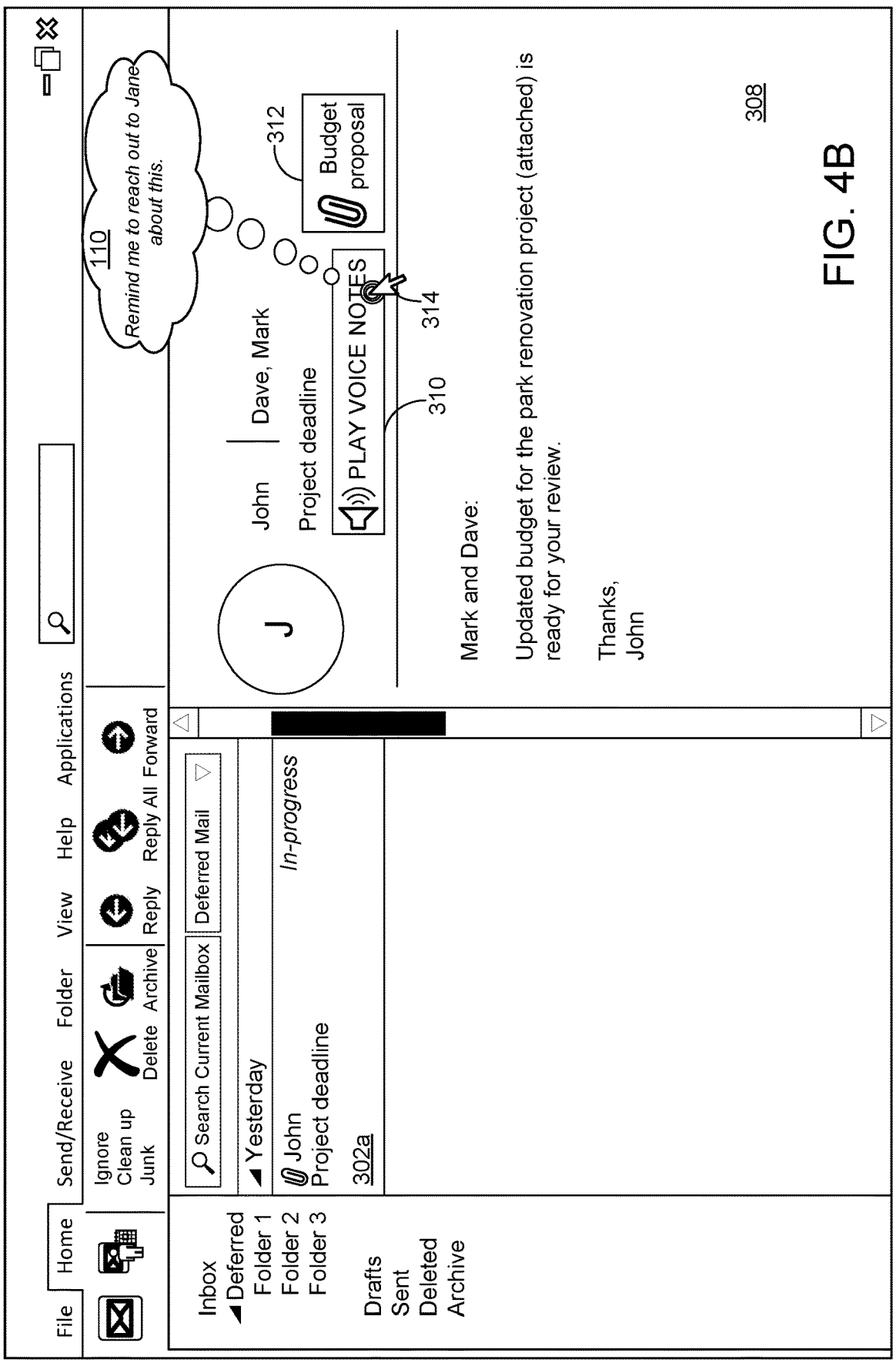

In other examples, a messaging application may distinguish deferred messages from other messages in any other suitable manner, such as via a separate folder. The message may be moved to the deferred folder either at the time of deferral, or when a specified target situation is reached. FIGS. 4A-4B show an example user interface 400 for an email application that displays deferred messages in different folder than non-deferred messages. FIG. 4A shows user interface 400 displaying an "Inbox" 402 including a deferred messages folder 404 that can be selected as a current mailbox for viewing. FIG. 4B shows the user interface 400 after the deferred messages folder 404 has been selected and illustrates deferred, in-progress messages (e.g., message 302a) presented in the current mailbox. Further, FIG. 4B shows presentation of the annotation 110 via selection of user interface element 310. In other examples, a messaging application may differentiate deferred messages from non-deferred messages in any other suitable manner, including displaying the deferred messages in a different color, in a different text style, in a separate task list, and/or with the above-mentioned in-progress status identifier.

Further, in some examples, instead of displaying deferred messages as having a different appearance than undeferred messages, a messaging system may automatically forward the deferred message to the appropriate user account upon the target situation being met. In this instance, the deferred message would again appear as unread and at a top of a time-sorted message hierarchy.

Figure 5B:
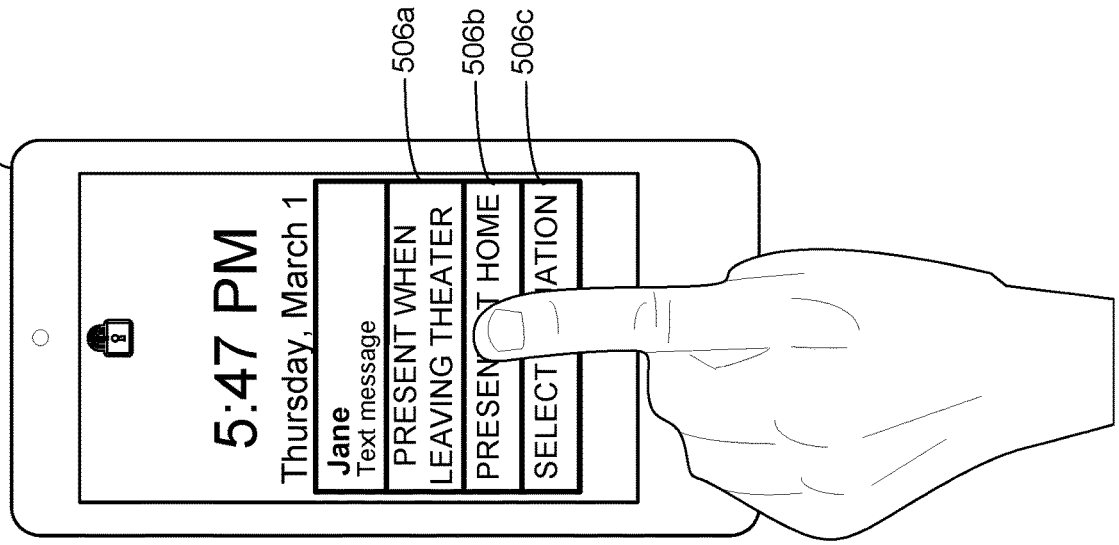
FIGS. 5A-5D show an example mobile computer user interface for deferring of a message.
Figure 5A:
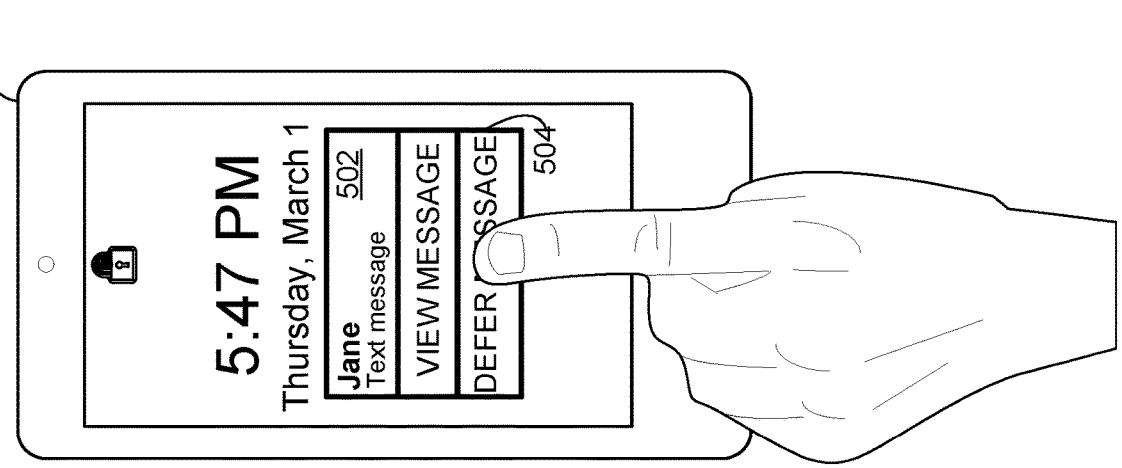
Figure 5D:
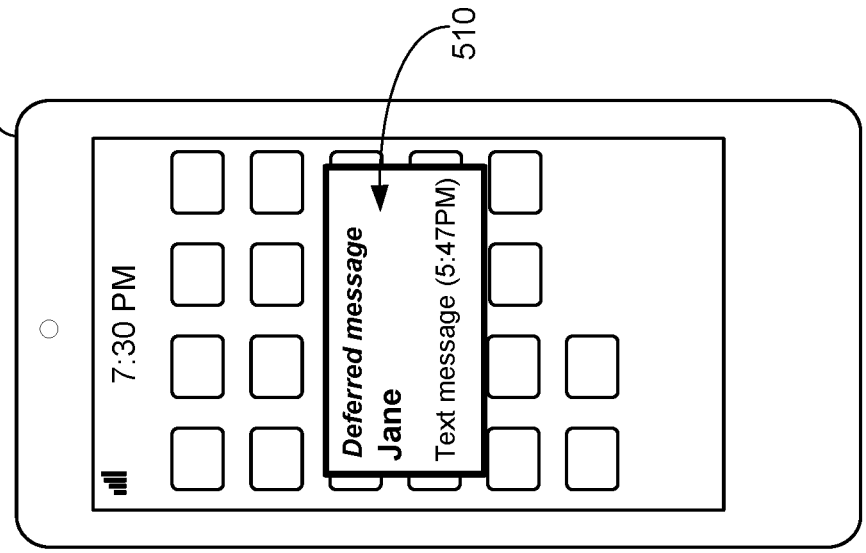
Figure 5C:
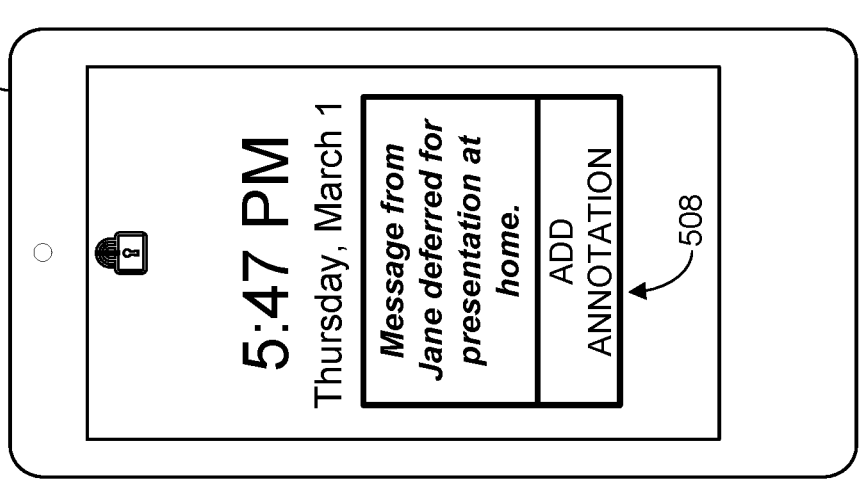

FIGS. 5A-5D show an example deferral of a message received via an instant messaging application. First, FIG. 5A shows mobile computing device 500 displaying a notification 502 of a received text message, which includes a deferral option 504. A user may select the deferral option 504 to request to defer the message for presentation at a target situation. Upon selection of the deferral option 504, the mobile computing device 500 displays deferral options 506a-c that permit a user to select a target situation in which to present the message, as illustrated in FIG. 5B. In this example, the user of mobile computing device 500 is watching a movie in a theater when the message notification 502 is received. Thus, upon selecting deferral 504, the mobile computing device 500 offers the user options to defer the message notification until after the user leaves the movie theater 506a, defer until the user arrives at home 506b, or defer until a user-specified situation 506c. FIG. 5C next shows the user interface after the user has selected to defer the notification until the user has arrived at home, and illustrates the display of an annotation input screen 508 useable to input an annotation (e.g. via text entry or drawing characters or other illustrations on a touch sensor of the mobile device). FIG. 5D illustrates the deferred display of the notification 510 once the mobile device user is in the target situation (has arrived home in this example).

The deferral recommendations shown in FIGS. 5A-C may be determined in any suitable manner. For example, a messaging platform service for sending messages between end user client devices may be configured to send deferral recommendations to an intended message recipient device based upon past behaviors of the intended message recipient. In some such examples, recommendations may be generated by a machine learning model trained to output suitable recommendations based upon observed past user actions.

Figure 6:
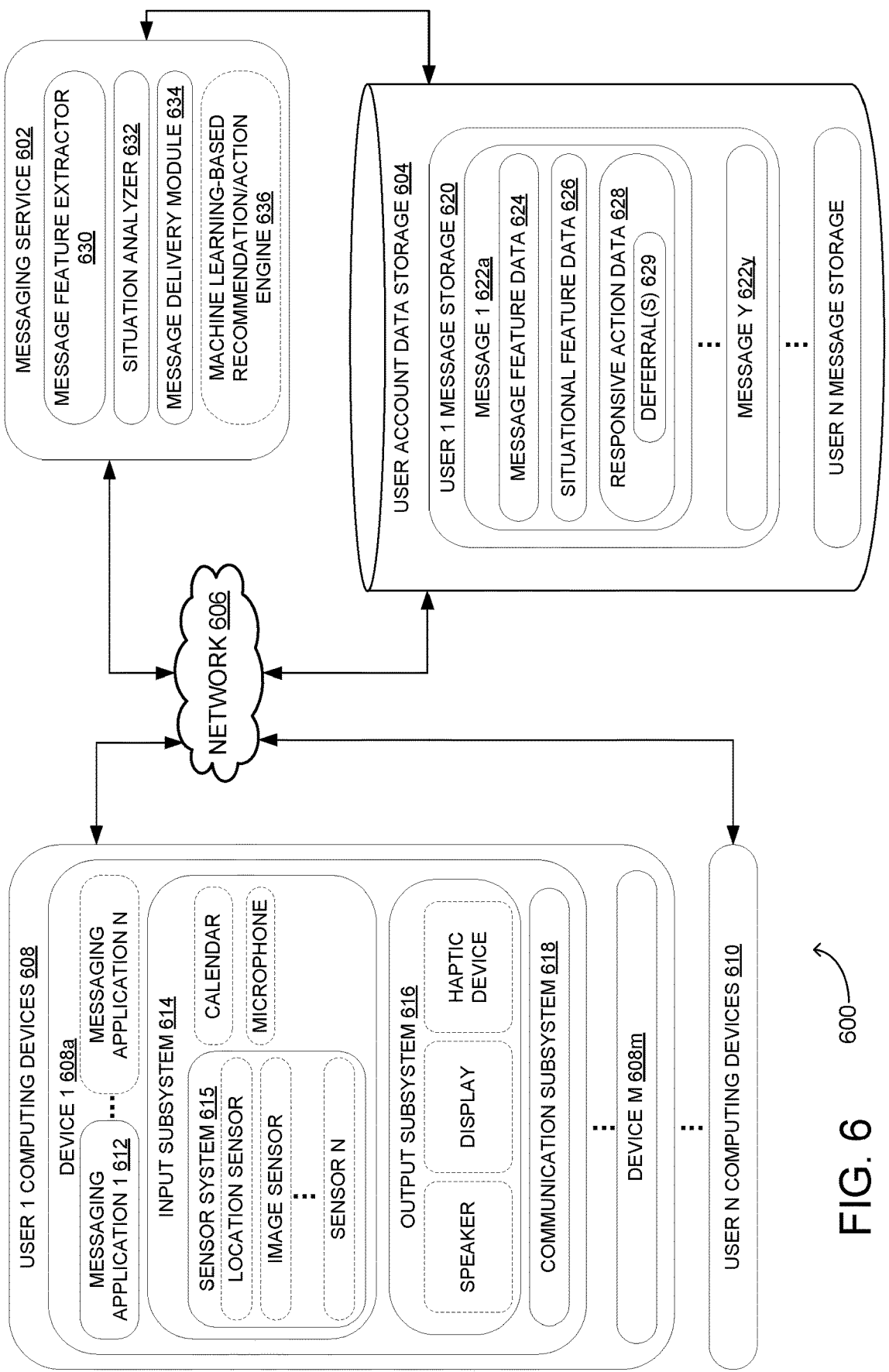
FIG. 6 shows a block diagram illustrating an example messaging system.

Prior to discussing the generation of such recommendations in more detail, an example messaging system 600 is described with reference to FIG. 6. Messaging system 600 comprises a messaging service 602 and user account data storage 604. The messaging service 602 and the user account data storage 604 may be implemented, for example, via a cloud-based service residing at remote computing devices (e.g. data center computing devices). The messaging service 602 and the user account data storage 604 may be connected via a network to end user computing devices, illustrated as a plurality M of computing devices 608 associated with user 1 and also device(s) for N−1 other users of the system. End user computing devices may include, as examples, mobile phone(s), personal computer(s) (e.g., a desktop and/or laptop computer(s)), tablet(s), headless computer(s) (e.g. interactive audio digital personal assistant devices), and/or wearable computer(s) (e.g. band(s), head-mounted di splay(s)).

Each end user computing device 608a-m includes one or more messaging applications 612, such as an email messaging application, a text messaging application, and/or a social media messaging application. Each end user computing device 608a-m further includes an input subsystem 614, which may include a sensor system 615 comprising one or more sensors such as a location sensor, an image sensor, a touch sensor, and a microphone. Each end user computing device 608a-m further includes an output subsystem 616 including one or more output devices, such as a speaker, a display device, and a haptic device. Additionally, each end user computing device 608a-m includes a communication subsystem 618 for communicating with other devices of system 600. Other example hardware components for any of these devices/components are described below with reference to FIG. 12.

User account data storage 604 stores data associated with users 1 through N. User 1 message storage 620 is shown as including messages 622a-y addressed to user 1. The messages may be addressed to a same account for user 1, or different accounts (e.g. an email account, a text messaging account, and/or a social network messaging account). User account data storage 604 also may store, for each message or for each message of a subset of messages, message feature data 624, situational feature data 626, and responsive action data 628. Message feature data 624 may include such features as keywords or other representations of the content of a message, message sender information, sender domain information, and/or other data or metadata regarding the message. Situational feature data 626 may include features regarding a situation in which the message was sent to an intended recipient, such as a time, an indication of a device type of an-use computing device at the time the message was sent, calendar data associated with a time the message was sent, a location of the message recipient when the message was sent, and/or one or more user preferences. Responsive action data 628 may include data regarding any action taken by user 1 upon receiving the message, such as reading the message, deleting the message, forwarding the message, replying to the message, and requesting to defer 629 the message.

Messaging service 602 includes a message feature extractor 630 for obtaining the message feature data 624 for each message 622a-y. For example, the message feature extractor 630 may parse and analyze the content of the message, identify the sender of the message, determine a domain of the sender of the message, and/or determine any other suitable features related to the message. Messaging service 602 further includes a situation analyzer 632 for obtaining situational feature data 626 for messages. For example, the situation analyzer 632 may access clock data, calendar data, location data, and other situational data related to the user. Location data may include raw location data, such as global positioning sensor data and/or WiFi access point data, and/or may include higher level information derived from such data, such as the entities/types of entities found at locations (e.g. restaurant, movie theater, residence, place of employment). Likewise, time and date data may include raw data, and/or information regarding calendar events or habitually identified events that may be associated with the determined time and date. The situation analyzer 632 may obtain such information from relevant applications and sensors on end user computing devices 608, and/from another cloud-based service that may track such information (e.g. a cloud-based digital personal assistant service).

The messaging service 602 further includes a message delivery module 634 configured to determine when to send notifications of deferred messages to end user devices. For example, the message delivery module 634 may compare detected features of a current situation (e.g., a time, a location of the user, an in-use computing device associated with the user) to variables of a target situation stored in a feature vector for each deferred message in a deferred message queue. The message delivery module 634 then may send a notification for a message to an end user device when it is determined that the variables of the current situation meet the target situation for presenting the message.

Figure 7:
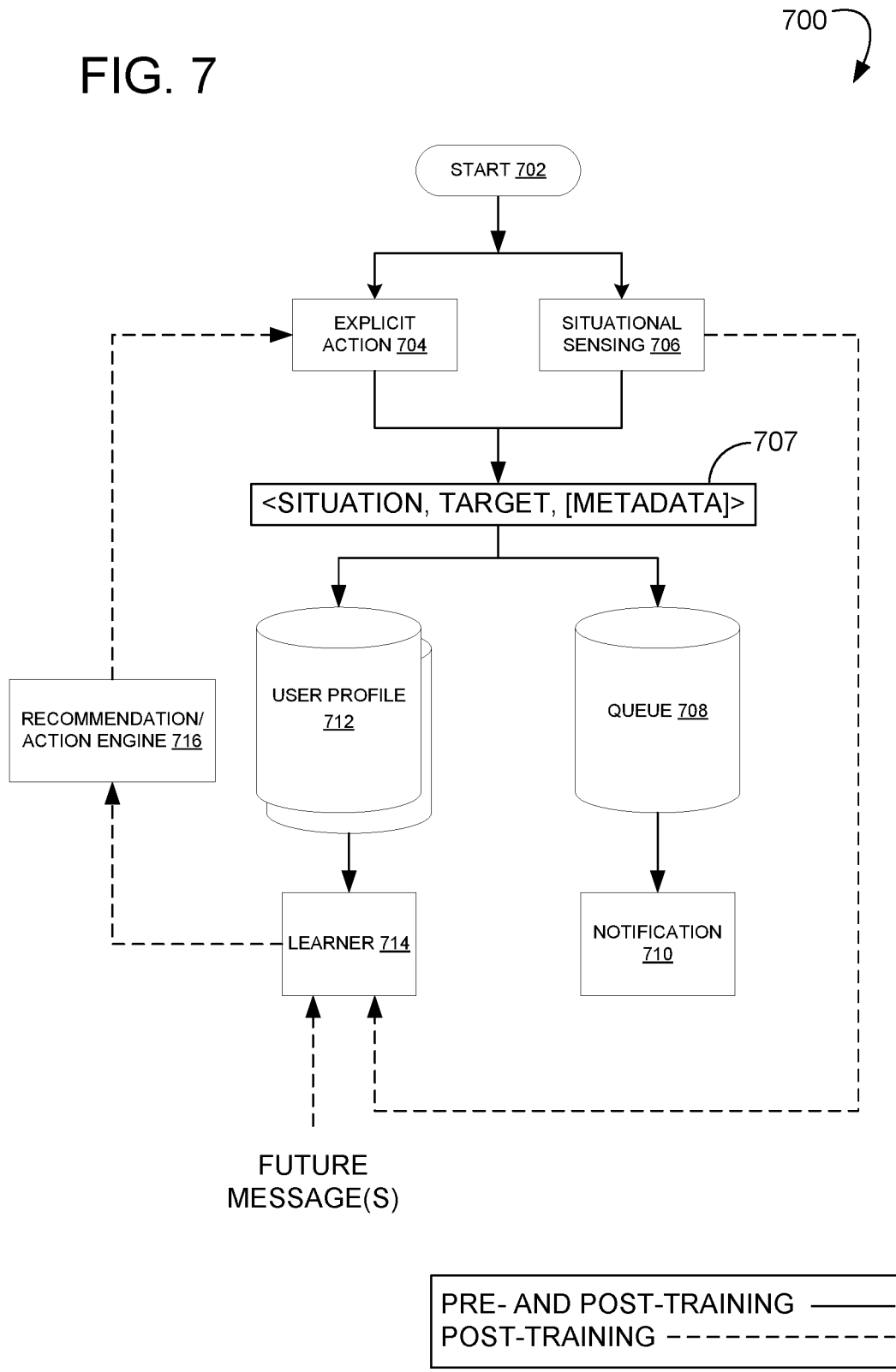
FIG. 7 shows a flow diagram illustrating data flow within an example messaging service.

The message delivery module further may be configured to send deferral recommendations to end-user devices. As mentioned above, deferral recommendations may be provided based upon past user behaviors via message features and situational features observed when various messaging actions are taken. To produce suitable recommendations, messaging service 602 may utilize a machine learning-based recommendation/action engine 636 for determining one or more responsive actions likely to be taken by a user for a message, and for outputting recommendations to present and/or actions to take automatically. FIG. 7 shows a flow diagram illustrating an example data flow 700 within a messaging service that includes a recommendation/action engine. Data flow 700 may be implemented in messaging system 600, for example. At 702, the messaging service receives incoming messages. For each message encountered, the user may take one or more explicit actions 704. For example, a user may choose to read and not defer the message, or may defer the message for presentation at a later time. Deferral adds the message to a deferred message queue 708. In the process of adding the message to the queue 708, the user may augment the message with an annotation by recording voice notes or providing other suitable input. Further, the user may explicitly indicate a target situation in which to present the message, such as a device type, a time, a place, an/or an occasion for which the message may be actionable. In addition to the explicit actions 704 taken by the user, the data flow 700 also includes situational sensing 706 of a current situation in which each message is read or queued for deferral. For example, situation sensing 706 may include obtaining (e.g., via situational analyzer 632) situational features in the form of sensor and/or application data related to the current situation, as described above.

For each message, identified situational features, a target situation indicated, and any other suitable data, such as an annotation, are stored as a feature vector 707 for the message and are input into the queue 708. Such data also may be stored in a user profile 712. When the user arrives at a context and/or a situation that meets the target situation indicated, a notification 710 of the message is sent based upon the target situation. For example, where a target situation is indicated to be the user being at home, a notification (including any annotation) may be sent to a user's mobile phone upon determining that the user is at home and the mobile device is the current in-use computing device. Further, the notification 710 may be sent when a user explicitly requests delivery of the notification. It will be understood that the terms "notification" and "message" as used herein both may represent the full message or a summary of the message.

As mentioned above, in addition to being stored temporarily in the queue 708, the message and associated feature vector may be stored in a user profile 712 (e.g., in user 1 message storage 620). Data stored in the user profile 712 is input into a learner 714, which trains a machine learning algorithm(s) to determine inferences regarding possible target situations for presenting a message. Learner 714 may be used, for example, to train a recommendation/action engine 716. The learner 714 and recommendation/action engine 714 are collectively an example of the machine learning-based recommendation/action engine 636 of FIG. 6. Any suitable machine learning algorithm(s) may be used, including but not limited to a neural network, a support vector machine, a decision tree, a random forest, and a Bayesian network.

The recommendation/action engine may be trained to provide any suitable output. For example, the learner 714 may be trained to rank two or more target situations (e.g., by confidence score) based on a likelihood that a message having certain message features will not be deferred in those target situations. The output of the ranked possible target situations may be input to the recommendation/action engine 716, which may output a recommendation to a user device regarding an action(s) to take, or an action to take automatically on a user's behalf, as described in more detail below. Examples of target situations include locations, modes of transportation, states of transit (e.g., during commute, at destination), times, in-use devices, proximity to a contact, and combinations of such factors.

In addition to data from the user profile 712 input into the learner 714, the learner 714 may utilize cohort data and/or general population data to train the machine learning algorithm(s). Cohort data and/or population data may be particularly useful to train the model prior to obtaining a sufficient amount of user profile data for a more personalized model. The term "cohort" refers to a group, an organization, or a collection of users having one or more shared traits. For example, users of a professional organization may be classified as a cohort. The term "population" refers to larger set of possible training data obtained from a wider scope of users of the message service 700 than cohort data. Training the algorithm(s) using cohort data may provide advantages over training with population data in some examples, as the initial data may be obtained from a collection of users having more similar message application access patterns, interests, and/or constraints (e.g., time constraints) to a user, and thus may be more relevant for that particular user. However, cohort data may be sparse. Thus, in other examples, the additional or alternative use of population data may offer a larger data set.

Any suitable methods may be used to train such a machine learning model. For example, a messaging service may utilize feedback to train a machine learning model via a supervised learning approach. For example, a user's request in a situation having particular situation features for deferral of a message having particular message features may be used as an assumption of ground truth to train the model to recognize that a message having similar features is likely to be deferred where corresponding situation data is similar. Further, a target situation input for a deferred message may provide the model(s) with data regarding a situation in which a message with similar features is likely not to be deferred. Sufficient instances of such data may be used to train a user-specific model for outputting recommendations and/or actions to take with regard to received messages. Further, such a personalized model may be continually refined over time as more and more user-specific data is observed. In particular, user actions taken in response to outputs provided by the recommendation/action engine may be input as ground truth data to train the model(s) regarding which responsive action a user is likely to take.

The messaging service also may use explicit feedback to train the machine learning model(s). For example, the messaging service may request user feedback regarding a recommendation provided, and feedback received may be used as ground truth for further training the model. Over time, via such implicit and/or explicit feedback, the recommendation/action engine may learn such actions as not to deliver work-related messages during non-work time, to defer messages from certain senders, related to certain topics, received at certain times, etc. to be deferred or delivered in particular situations, etc.

Unsupervised machine learning also may be used, in which situational features and message features for messages may be received as unlabeled data, and patterns in user actions taken in response are learned over time. Suitable unsupervised machine learning algorithms may include K-means clustering models, Gaussian models, and principal component analysis models, among others. Such approaches may produce, for example, a cluster, a manifold, or a graph that may be used to make predictions related to situations in which a user may wish to read messages having particular message features based upon current situational features. Additionally, reinforcement learning also may be used in some instances. In any machine learning-based implementation, user participation may be an opt-in option, and a user may opt out at any time.

Figure 8B:
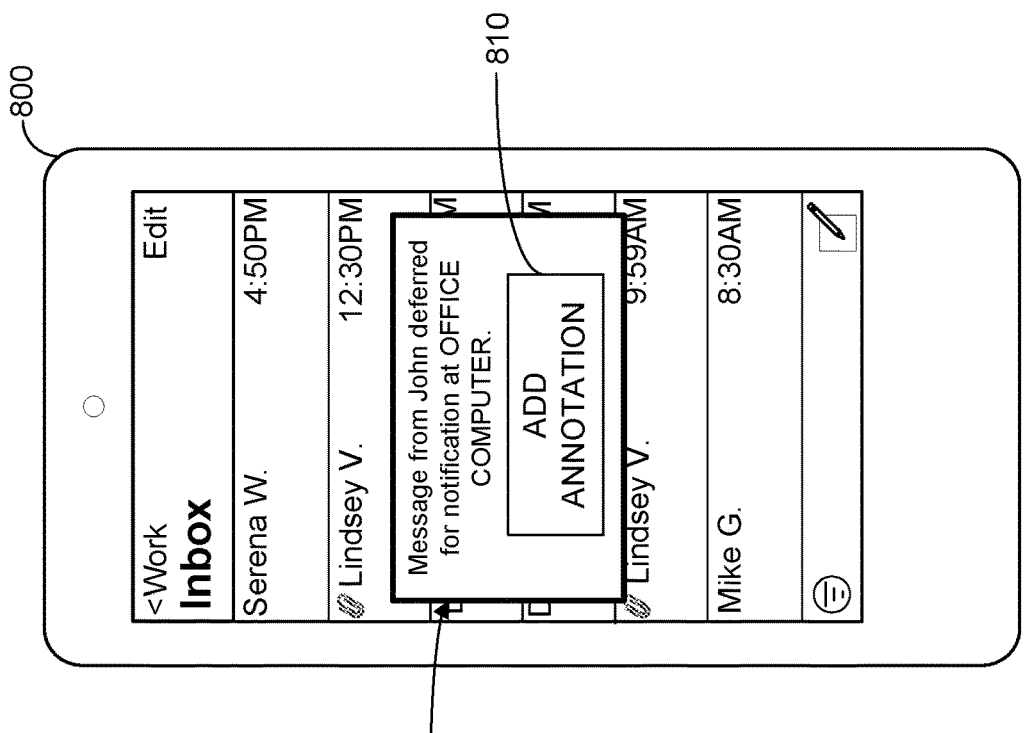
FIGS. 8A-8B show another example mobile device user interface for deferring a message.
Figure 8A:
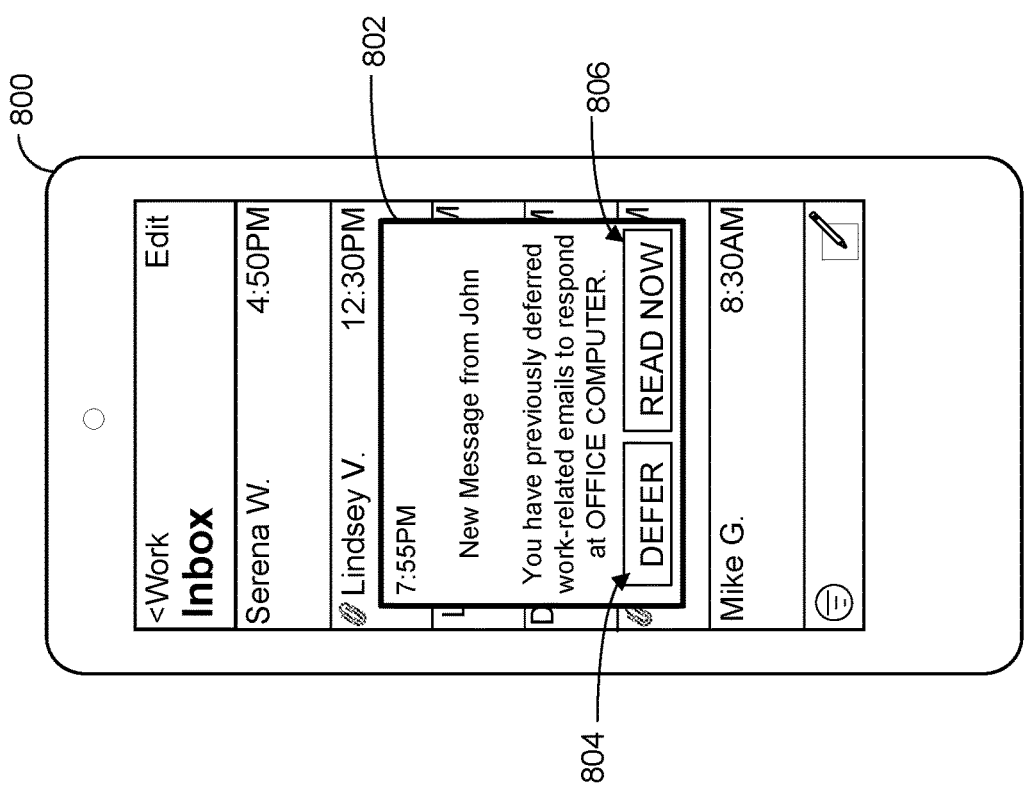

FIGS. 8A-8B illustrate another example messaging application user interface in which deferral recommendations determined by machine learning are presented to user. In FIG. 8A, a mobile computing device 800 displays an example user interface for an email messaging application, and a user is currently triaging messages in a "work" inbox. At 7:55 PM, the computing device 800 receives a message from John and outputs a notification 802 regarding the new message. Rather than simply notifying the user of the new message, the notification 802 includes a recommendation to defer the message based upon prior actions taken upon receiving work-related emails outside of office hours. An option to accept the recommendation to defer 804 the message and an option to read the message now 806 are included in the notification. In this example, the notification 802 also includes an explanation of why the recommendation was produced. Such an explanation may help to remind a user that messaging actions are being analyzed for the determination of recommendations/actions, and thus may help to reinforce a user's decision to opt into the machine learning functionality, or may help the user to decide to opt out. Upon receiving selection of the recommended deferral 804 of the message for presentation at the office computer, the mobile computing device 800 may display a user interface 808 confirming the deferral of the message and also may provide a user interface control 810 for inputting an annotation to present with the message.

As mentioned above, in addition to recommendations, a messaging system also may be configured to automatically take an action on a user's behalf based upon the output of a trained machine learning model. For example, referring again to FIG. 8A, the messaging service may determine, based upon the message features of the message from John, that the message includes work-related content and is sent from a work colleague. In this example, based upon the obtained situational features, the messaging service may also determine that the message recipient is outside of his normal work hours. Rather than present the recommendation to defer the message, as shown in FIG. 8A, the messaging service may, in some examples, defer the message on the user's behalf and send a message notifying the user that the message has been deferred. The notification may include an option to cancel the deferral, and/or may present other actions that a user may wish to take, such as the selection of a different recommended deferral target situation or the user specification of a deferral target situation. Further, in some examples, the messaging service may defer the message on the user's behalf without sending a notification of the deferral, which may help to prevent distractions during a time in which the user does not wish to receive messages, for example, while driving. Situations in which to automatically defer a message may be learned over time, such that the recommendation/action engine may learn to automatically defer messages from certain senders, related to certain topics, received at certain times, and also learn in what situations to present automatically deferred messages.

Figure 9:
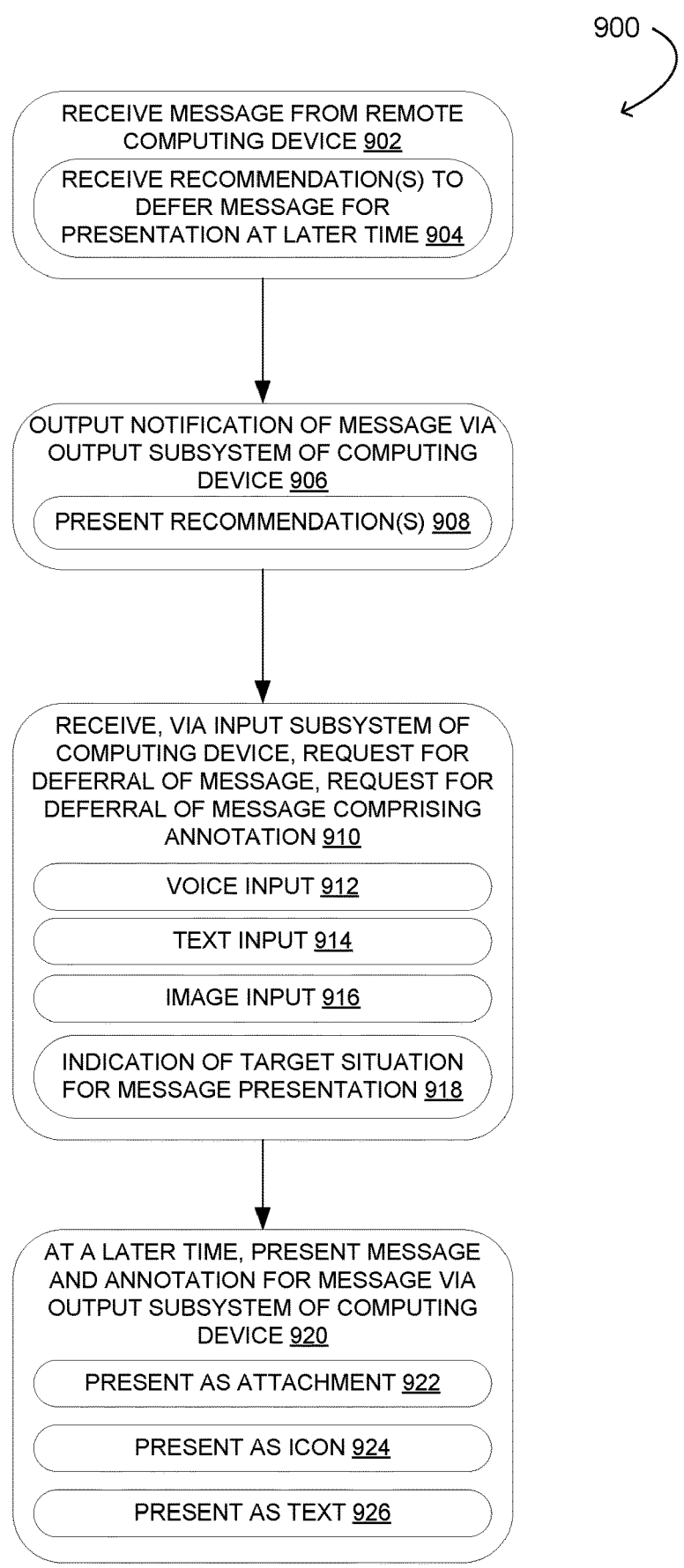
FIG. 9 is a flow diagram illustrating an example method for deferring a message and receiving an annotation to the message for later presentation.

FIG. 9 shows a flow diagram illustrating a method 900 for deferring a message and receiving an annotation to the message for later presentation. Method 900 may be implemented as stored instructions executable by a computing device, such as an end user computing device, for example. At 902, method 900 includes receiving a message from a remote computing device. The remote computing device may comprise a cloud-based computing device operating a messaging service, for example. Receiving the message may include, at 904, receiving one or more recommendation(s) to defer the message for presentation in a later specified target situation. Such a recommendation may be received, for example, from a messaging service utilizing a machine learning-based recommendation/action engine.

At 906, method 900 includes outputting a notification of the message via an output subsystem of the computing device. In some examples, outputting the notification may include, at 908, presenting the recommendation(s) to defer the message. At 910, method 900 includes receiving, via an input subsystem of the computing device, a request for deferral of the message, wherein the request for deferral of the message comprises an annotation. The computing device may receive the annotation in any suitable manner, including by voice input 914, text input 914, and/or image input 916. Further, receiving the request for deferral of the message may include receiving an indication of a target situation for message presentation, as indicated at 918. In some examples, the annotation and the indication of the target situation for message presentation are received via a same input, such as via a same speech input. Further, in some examples, the annotation and/or the indication of the target situation for message presentation are received via user selection of one or more deferral options presented on a user interface.

Method 900 further includes, at a later time, presenting the message (e.g., the message itself or a notification/summary of the message) and the annotation for the message via an output subsystem of the computing device based upon the target situation being reached, as indicated at 920. In various examples, the message may be presented on a same device or different device as when the deferral request was made. For example, the message may be presented on a device explicitly specified as the target situation or as part of the target situation. The message as presented may include the annotation as an attachment with the message at 920, as indicated by an icon at 924, and/or as a text at 926. Further, depending upon the format of the annotation, the annotation may be presented using speech-to-text conversion or text-to-speech conversion at a user's option.

Figure 10:
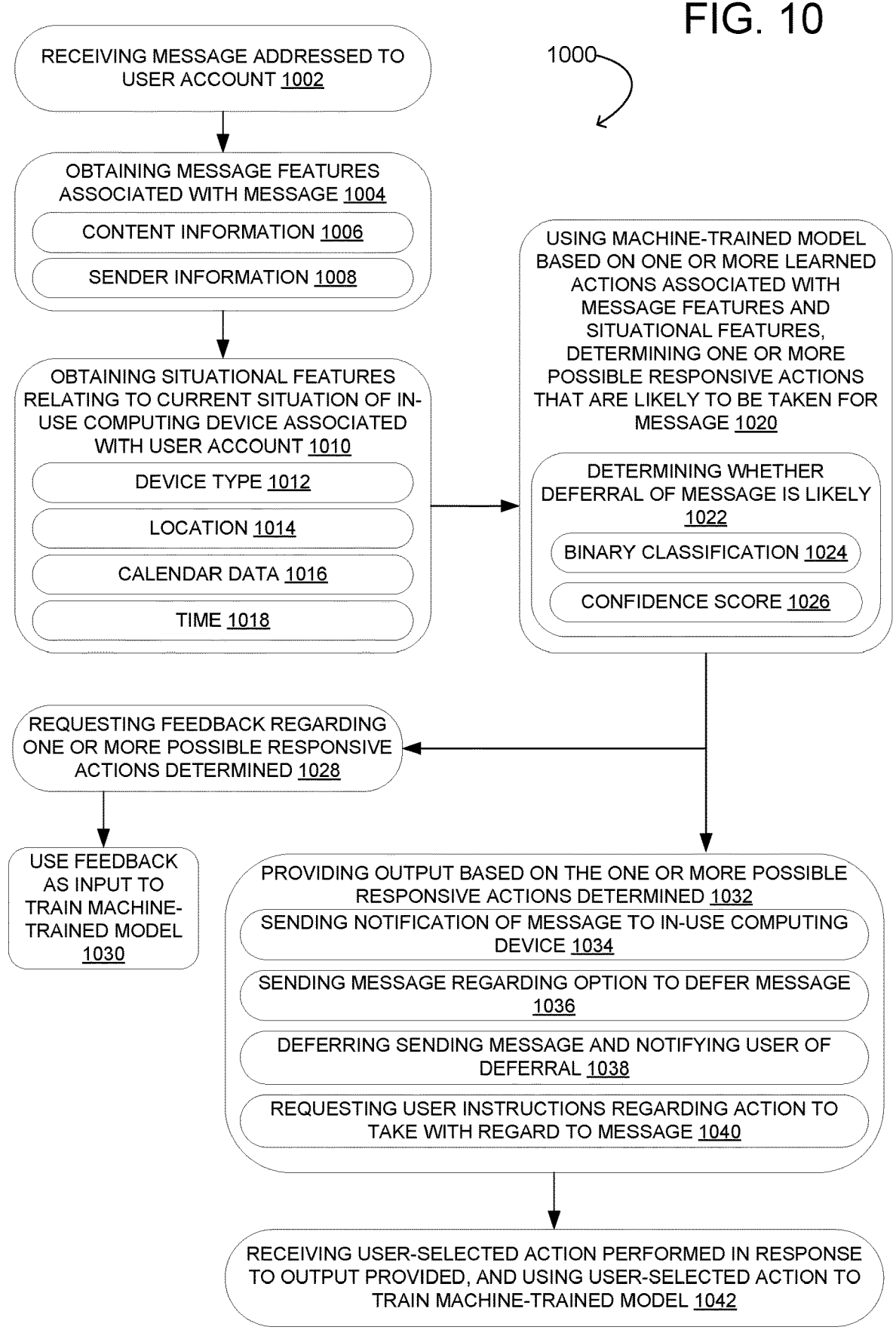
FIG. 10 is a flow diagram illustrating an example method for providing deferral recommendations in a messaging system.

FIG. 10 shows a flowchart illustrating an example method 1000 for providing deferral recommendations in a messaging system. Method 1000 may be implemented as stored instructions executable by a computing device to perform the method, for example. Method 1000 includes, at 1002, receiving a message addressed to a user account. The message may be addressed to an email messaging account, an instant messaging account (e.g., a screen name, a phone number), or any user account associated with a suitable messaging application. At 1004, method 1000 includes obtaining message features associated with the message. In some examples, obtaining message features includes obtaining content information associated with the message, at 1006. For example, obtaining content information may include parsing the message for keywords that may be indicative of a particular target situation, such as work-related keywords or family-related keywords. Additionally or alternatively, obtaining message features may include obtaining sender information, at 1008. Sender information may include information such as a sender email address, a sender name, a communication history with the sender and/or any other suitable information regarding the sender.

At 1010, method 1000 includes obtaining situational features relating to a current situation. For example, the situational features may be obtained from an in-use end-user computing device (and potentially other computing device(s)) associated with the user account (e.g., from one or more sensors, applications, user input devices, of the in-use computing device) or from a service that tracks such data (e.g., a digital personal assistant service) to obtain the situational features. Any suitable situational features may be obtained, such as a device type of the in-use computing device 1012, a location of the in-use computing device 1014, calendar data 116, and time data 118, as examples.

Method 1000 further includes, at 1020, using a machine learning model trained based on one or more learned actions associated with the message features and the situational features to determine one or more possible responsive actions that are likely to be taken for the message. For example, at 1022, determining the one or more possible responsive actions may include determining whether deferral of the message is likely, and if so, what target situation is likely to be specified. Such a determination may be a binary classification, as indicated at 1024, or may comprise a ranking based upon a confidence score for each of a plurality of possible target situations, at 1026.

In some examples, method 1000 may include, at 1028, obtaining feedback regarding the one or more possible responsive actions determined. For example, the messaging service may explicitly request user feedback regarding the presented responsive actions, or may implicitly observe the action taken by the user upon being presented with the notification. Where feedback is obtained, method 1000 may include, at 1030, using the feedback as input to train the machine learning model.

Continuing, method 1000 includes, at 1032, providing an output based on the one or more possible responsive actions determined. Providing the output may include, for example, sending the notification of the message to the in-use computing device at 1034 (e.g., where it is determined that the user is likely not to defer the message), sending an option to defer the message at 1036, or automatically deferring the message and notifying the user of the automatic deferral at 1038 (which may include providing an option to cancel the deferral). Further, in some examples, the messaging service may request user instructions regarding an action to take with regard to the message, at 1040.

Method 1000 further may include, at 1042, receiving information regarding a user-selected action performed in response to the output provided, and using the information regarding the user-selected action to train the machine learning model. For example, the output provided may comprise sending a message regarding multiple possible target situations determined. Upon receiving a user selection of a target situation in which to present the message, this action may be input into the machine learning model as a ground truth associated with the message features and situational features obtained for the message.

Figure 11:
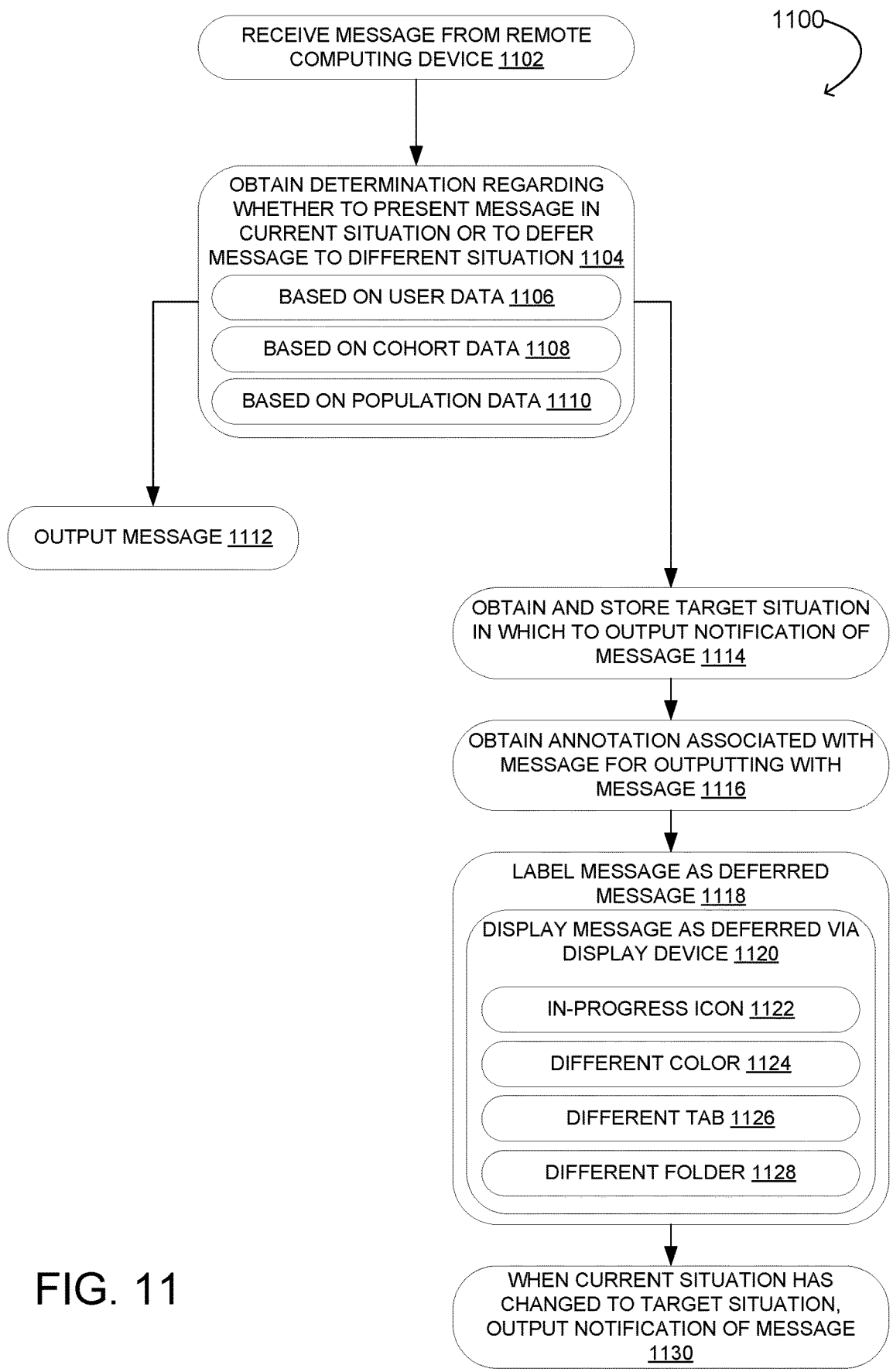
FIG. 11 is a flow diagram illustrating an example method for presenting a message via a computing device.

FIG. 11 shows a flowchart illustrating an example method 1100 for presenting a message via a computing device. Method 1100 may take the form of stored instructions executable by a computing device to perform the method. At 1102, method 1100 includes receiving a message from a remote computing device. At 1104, method 1100 includes obtaining a determination regarding whether to present the message in a current situation or to defer the message to a different situation. In some examples, method 1100 may include obtaining the determination from an input subsystem of a local computing device. In other examples, method 1100 includes obtaining the determination from a remote computing device, such as a remote messaging service (e.g., messaging service 602). In various examples, the determination may be based on user data 1106 for an intended recipient, cohort data 1108, and/or population data 1110. It will be understood that a user may be a member of multiple cohorts, and data from one or more cohort groups (e.g., an organization, a gender, an age group, a job title) may be used to obtain the determination.

Based upon a determination to present the message in the current situation being obtained, method 1100 includes outputting the message, at 1112. Based upon a determination not to present the message in the current situation being obtained, method 1100 includes, at 1114, obtaining and storing a target situation in which to output a notification of the message. In some examples, obtaining the target situation includes requesting user input of the target situation for presenting the message. In other examples, obtaining the target situation includes using a machine learning model to output one or more target situations in which the user would be likely to read the message. Method 1110 may further include, at 1116, obtaining an input of an annotation associated with the message for outputting with the message. Obtaining the annotation may comprise prompting a user to provide an annotation or may comprise parsing a user input to distinguish a target scenario and an annotation specified in the message. The annotation may be received in any suitable form, including but not limited to one or more of a text input, an audio input, and an image input.

At 1118, method 1100 includes labeling the message as a deferred message. In examples where the computing device comprises a display device, method 1100 may include, at 1120, displaying the message as deferred via the display device prior to the current situation changing to the target situation for presenting the message. Displaying the message as deferred may include displaying the message with an in-progress icon at 1122, displaying the message in a different color as other non-deferred messages at 1124, displaying the message in a different tab as other non-deferred messages at 1126, and/or displaying the message in a different folder as non-deferred messages at 1128. In another example, the message may be auto-forwarded to a user at a time of the target situation, and thus may appear at a top of a time-sorted message hierarchy. In other examples, the message may be displayed as deferred in any suitable manner.

When the current situation has changed to the target situation, method 1100 includes outputting the notification of the message, at 1130. The computing device may output the notification of the message via any suitable output subsystem. For example, the notification may be output via one or more of a speaker and a display. In some examples, the notification may be output with an explanation regarding a reason for the message deferral. For example, a work-related email may be deferred on behalf of a user when the user is outside of working hours, and upon outputting the notification of the message, the notification may also include an explanation regarding the decision to not present the message when it initially arrived in the user's inbox. This type of notification may help the user to decide to opt out of a machine-learning functionality, or may help to assure a user regarding their decision to opt-in to using the machine-learning functionality.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic machine 1202 and a storage machine 1204. Computing system 1200 may optionally include a display subsystem 1206, input subsystem 1208, communication subsystem 1210, and/or other components not shown in FIG. 12.

Logic machine 1202 includes one or more physical devices configured to execute instructions. For example, the logic machine 1202 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1202 may include one or more processors configured to execute software instructions. Additionally or alternatively, the logic machine 1202 may include one or more hardware or firmware logic machines configured to execute hardware or firmware instructions. Processors of the logic machine 1202 may be single-core or multi-core, and the instructions executed thereon may be configured for sequential, parallel, and/or distributed processing. Individual components of the logic machine 1202 optionally may be distributed among two or more separate devices, which may be remotely located and/or configured for coordinated processing. Aspects of the logic machine 1202 may be virtualized and executed by remotely accessible, networked computing devices configured in a cloud-computing configuration.

Storage machine 1204 includes one or more physical devices configured to hold instructions executable by the logic machine 1202 to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 implemented to perform a particular function. In some cases, a module, program, or engine may be instantiated via logic machine 1202 executing instructions held by storage machine 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1206 may be used to present a visual representation of data held by storage machine 1204. This visual representation may take the form of a graphical user interface (GUI). As the herein described methods and processes change the data held by the storage machine 1204, and thus transform the state of the storage machine 1204, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem 1210 may be configured for communication via a wireless telephone network, or a wired or wireless local- or wide-area network. In some embodiments, the communication subsystem 1210 may allow computing system 1200 to send and/or receive messages to and/or from other devices via a network such as the Internet.

Another example provides a computing device, comprising an output subsystem comprising one or more output devices, an input subsystem comprising one or more user input devices, a logic device, and memory storing instructions executable by the logic device to receive a message from a remote computing system, output a notification of the message via the output subsystem, and receive via the input subsystem a request for a deferral of the message, the request for the deferral comprising an annotation to be stored for later presentation with the message. In such an example, the annotation may additionally or alternatively comprise one or more of a voice input, a text input, and an image input. In such an example, the annotation may additionally or alternatively include an indication of a target situation for message presentation. In such an example, the instructions may be additionally or alternatively executable to, prior to receiving the request for the deferral of the message, receive from the remote computing system a recommendation to defer the message for presentation at the later time, and present the recommendation via the output subsystem. In such an example, the computing device may additionally or alternatively comprise a headless device, a phone, a laptop computer, a desktop computer, or a wearable device. In such an example, the instructions may be additionally or alternatively executable to, at a later time, present via the output subsystem the message and the annotation for the message, wherein presenting the annotation for the message comprises one or more of presenting the annotation as an icon associated with the message and presenting the annotation as a text translation within a body of the message.

Another example provides, enacted on a computing device, a method comprising receiving a message addressed to a user account, obtaining message features associated with the message, obtaining situational features relating to a current situation of an in-use computing device associated with the user account, via a machine learning model based on one or more learned actions associated with the message features and the situational features, determining one or more possible responsive actions that are likely to be taken for the message, and providing an output based on the one or more possible responsive actions determined. In such an example, obtaining the message features may additionally or alternatively comprise obtaining information related to one or more of a content of the message and a sender of the message. In such an example, obtaining the situational features may additionally or alternatively comprise receiving an indication of one or more of a device type of the in-use computing device, a location of the in-use computing device, calendar data, and clock data. In such an example, the method may additionally or alternatively comprise requesting feedback regarding the one or more possible responsive actions determined, and wherein the feedback is used as an input to train the machine learning model. In such an example, determining the one or more possible responsive actions may additionally or alternatively comprise determining whether deferral of the message is likely. In such an example, determining whether deferral of the message is likely may additionally or alternatively be based on a confidence score. In such an example, providing the output may additionally or alternatively comprise one or more of sending a notification of the message to the in-use computing device, deferring sending of the message, and sending a message regarding an option to defer the message. In such an example, the method may additionally or alternatively comprise receiving a user-selected action performed in response to the output provided based on the one or more possible responsive actions determined, and using the user-selected action to train the machine learning model. In such an example, the one or more learned actions associated with the message features and the situational features may additionally or alternatively be based on data obtained data from one or more of the user account, a cohort, and a population.

Another example provides a computer readable medium comprising stored instructions executable by a computing device to receive a message from a remote computing system, obtain a determination regarding whether to present the message in a current situation or to defer the message to a different situation, when a determination to present the message in the current situation is obtained, then output the message, and when a determination to not present the message in the current situation is obtained, then obtain and store a target situation in which to output a notification of the message, label the message as deferred, and when the current situation has changed to the target situation, output the notification of the message. In such an example, the computing device may additionally or alternatively be a computing device comprising a display device, and wherein the stored instructions may be additionally or alternatively executable to, prior to the current situation changing to the target situation, display the message as being deferred in a manner that is visually distinct from undeferred messages. In such an example, displaying the message as deferred may additionally or alternatively comprise one or more of displaying the message with an in-progress icon, displaying the message in a different color, displaying the message in a different tab, displaying the message at a top of a time-sorted message hierarchy at a time of the target situation, and displaying the message in a different folder than messages not labeled as being deferred. In such an example, the stored instructions may be additionally or alternatively executable to, after obtaining the determination to not present the message in the current situation, obtain an annotation associated with the message for outputting with the message. In such an example, obtaining the determination regarding whether to present the message in the current situation or to defer the message to the different situation may additionally or alternatively comprise determining based on data obtained from one or more of a user, a cohort, and a population.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
memory storing instructions executable by the computing device to:
receive a message and a recommendation to defer the message for presentation at a later time from a remote computing system;
cause output of a notification of the message to a user;
present the recommendation;
receive at a first point in time a user input comprising a request for a deferral of the message, the request for the deferral comprising a user-provided annotation to be stored for later presentation with the message, the annotation including an indication of a target situation for message presentation, the indication of the target situation including a location of an in-use computing device; and
in response to the request, cause output, at a second point in time subsequent to the first point in time, of the message and the annotation to the user, the second point in time based at least in part on detection of a situation that meets the target situation.

2. The computing device of claim 1, wherein the annotation comprises one or more of a voice input, a text input, and an image input.

3. The computing device of claim 1, wherein the computing device comprises a headless device, a phone, a laptop computer, a desktop computer, or a wearable device.

4. The computing device of claim 1, wherein outputting the annotation for the message comprises one or more of presenting the annotation as an icon associated with the message and presenting the annotation as a text translation within a body of the message.

5. The computing device of claim 1, the indication of the target situation further including a device type of an in-use computing device.

6. Enacted on a computing device, a method comprising:
receiving a message addressed to a user account;
obtaining message features associated with the message;
obtaining situational features relating to a current situation of an in-use computing device associated with the user account;
inputting the message features and the situational features to a machine learning model;
via the machine learning model, determining a probability that the message is deferred exceeds a threshold;
outputting a deferral suggestion with a suggested annotation;
receiving, at a first point in time, a request for a deferral of the message, the request for the deferral comprising an adoption of the suggested annotation to be stored for later presentation with the message; and
outputting, at a second point in time subsequent to the first point in time, the message and the suggested annotation.

7. The method of claim 6, wherein obtaining the message features comprises obtaining information related to one or more of a content of the message and a sender of the message.

8. The method of claim 6, wherein obtaining the situational features further comprises receiving an indication of one or more of calendar data and clock data.

9. The method of claim 6, further comprising requesting feedback, and wherein the feedback is used as an input to train the machine learning model.

10. The method of claim 6, further comprising determining a target situation.

11. The method of claim 10, wherein determining the target situation is based on a confidence score of each of a plurality of target situations.

12. The method of claim 10, further comprising:
sending a message regarding the target situation; and
receiving a user selection regarding the target situation.

13. The method of claim 6, further comprising receiving a user-selected action performed in response to the message and the suggested annotation, and using the user-selected action to train the machine learning model.

14. The method of claim 6, the method further comprising receiving one or more learned actions associated with the message features and the situational features based on data obtained from one or more of the user account, a cohort, and a population.

15. A computer readable storage device comprising stored instructions executable by a computing device to:
receive a message and a recommendation to defer the message for presentation at a later time from a remote computing system;
cause presentation of the recommendation to a user;
obtain, from a user input, a determination to defer delivery of the message until a target situation is met, the target situation being described by a first set of situational features, the first set of situational features including a location of an in-use computing device and a device type of the in-use computing device, and the determination including a request for deferral of the message;
obtain a user-provided annotation comprising the first set of situational features describing the target situation in which to output a notification of the message;
label the message as deferred;
determine whether the first set of situational features match a second set of features; and
responsive at least in part to matching of the first set of situational features and the second set of features, cause output of the notification of the message and the annotation.

16. The computer readable storage device of claim 15, wherein the computing device comprises a display device, and wherein the stored instructions are further executable to, prior to the matching of the first set of situational features and the second set of features, display the message as being deferred in a manner that is visually distinct from undeferred messages.

17. The computer readable storage device of claim 16, wherein displaying the message as deferred comprises one or more of displaying the message with an in-progress icon, displaying the message in a different color, displaying the message in a different tab, and displaying the message in a different folder than messages not labeled as being deferred.

18. The computer readable storage device of claim 15, wherein the stored instructions are further executable to:
obtain a determination to not present the message in a current situation, and
obtain a second annotation associated with the message for outputting with the message.

19. The computer readable storage device of claim 15, wherein obtaining the determination to defer delivery of the message until a target situation is met is based on data obtained from one or more of a user, a cohort, and a population.

20. The computer readable storage device of claim 15, wherein the user-provided annotation comprises one or more of a voice input, a text input, and an image input.

* * * * *